(No Model.)
W. SMITH & T. E. HILLS.
LEG SPREADER FOR HORSES.
No. 454,885. Patented June 30, 1891.
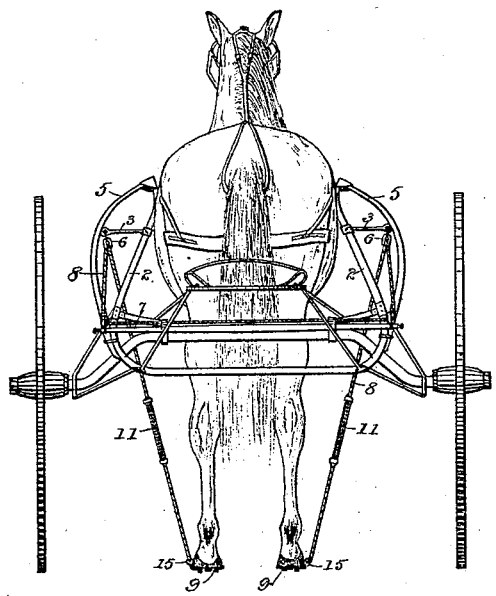
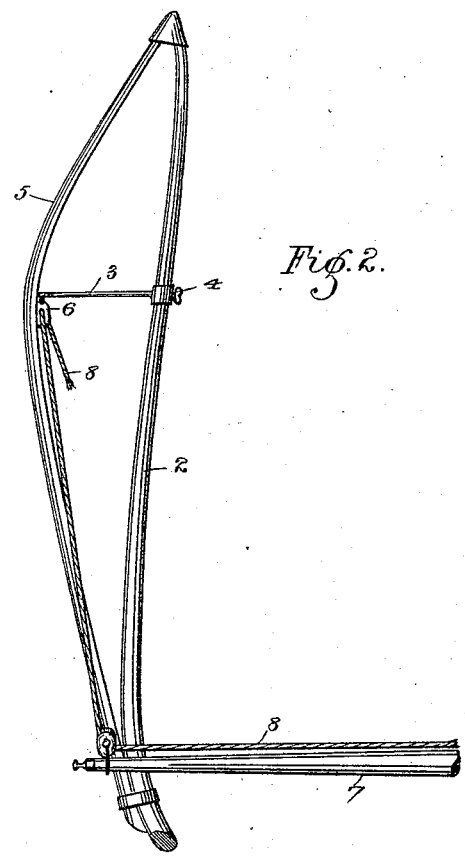
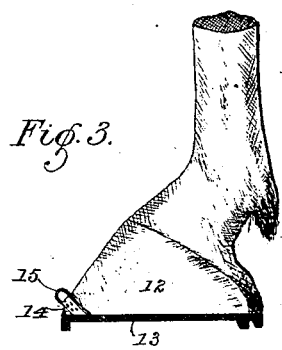
Witnesses:—
A. Mae Welch
C. L. Caldwell.
Inventors:—
William Smith
and
Theophilus E. Hills,
per Paul A. Merwin
Attorneys.

UNITED STATES PATENT OFFICE.

WILLIAM SMITH AND THEOPHILUS E. HILLS, OF HERON LAKE, MINNESOTA.

LEG-SPREADER FOR HORSES.

SPECIFICATION forming part of Letters Patent No. 454,885, dated June 30, 1891.

Application filed September 9, 1890. Serial No. 364,439. (No model.)

*To all whom it may concern:*

Be it known that we, WILLIAM SMITH and THEOPHILUS E. HILLS, of Heron Lake, Jackson county, Minnesota, have invented certain Improvements in Leg-Spreaders for Horses, of which the following is a specification.

Our invention relates to improvements in devices for attachment to the hind feet of trotting-horses for the purpose of swinging the feet outward when raised to step forward, so that they shall pass outside of the forward feet, thus improving the gait of the animal and the length of stride and preventing overreaching or striking of the hind feet upon the forward feet.

To this end our invention consists in the construction and the combination hereinafter described, and particularly pointed out in the claims.

In the accompanying drawings, forming part of this specification, Figure 1 is a rear view of a sulky with a horse attached thereto and fitted with our improved leg-spreader, showing its manner of attachment to the sulky and the feet of the horse. Fig. 2 is a detail of the shaft fitted with the adjustable spreader-arm and a guard to surround and protect the same, and Fig. 3 is a detail showing the manner of attaching the spreader-strap to the horse's foot.

In the drawings, 2 represents the shafts of the sulky, on each of which is adjustably arranged the outwardly-projecting arm 3, which is secured in any desired position along the shaft by means of the set-screw 4. This arm is protected and prevented from doing injury to anything against which it would strike by means of the guard 5, secured thereto and having its ends bent toward and secured to the shaft on either side of the arm. The outer end of the arm carries a sheave 6, and similar sheaves are arranged upon the whiffletree 7, through which runs the cord 8. The ends of this cord are carried downward and connected to the hind feet 9 of the horse. We prefer to arrange a piece of elastic web or cord 11 somewhere between the foot of the animal and the arm 3, although other means for making the connection between the two elastic may be used, if preferred.

A convenient method of attaching the cord 8 to the foot is shown in Fig. 3. A small notch is cut on the under side of the hoof 12 between it and the shoe 13, through which is passed a strap 14, having a ring or equivalent fastening device 15, to which the cord 8 is detachably secured. It will thus be seen that as the horse steps the foot as raised from the ground is carried slightly outward by means of the elastic tension of the cord 8. As the vehicle is drawn forward the distance between the foot which is taking a step and its connected arm 3 decreases, while the distance increases between the other foot and arm. The cord therefore runs through the sheaves as one foot is moved forward, so as to take up the slack which would be caused by the advance of the foot and to lengthen the connection between the other foot and other arm, the movement of the cord being reversed as a step is made with the other foot. The arms 3 may be adjusted along the shafts so as to serve simply to pull the feet outward as they are moved past, or may be carried forward so as to tend to carry the feet forward, and thus increase the length of stride.

It is obvious that the connection between the feet and arms may be independent of each other, if preferred; but the described connection gives more satisfactory results unless more hock action is required.

Other means of attachment to the foot or ankle of the horse may be employed, if preferred, so long as the connection be made below the fetlock of the animal.

We claim—

1. In a device of the class described, the combination, with the shafts of the vehicle, of rigid arms projecting laterally beyond the shafts of the vehicle, and cords extending from said arms beyond the sides of the shaft downward and adapted to be connected to the adjacent hind foot of a horse, substantially as and for the purposes set forth.

2. A leg-spreader comprising in combination a rigid outwardly-projecting arm arranged upon the vehicle-shaft, an exterior guard upon said shaft extending outside of said arm, and a flexible elastic cord secured to said arm and adapted to be detachably connected to the hind foot of the horse between said shafts, substantially as and for the purposes set forth.

3. In a device of the class described, the combination of the rigid outwardly-projecting arm 3, adjustable lengthwise of the shaft of the vehicle, the strap 14, adapted to be secured between the hoof and its shoe and projecting therefrom, and the elastic cord 8, adapted to connect said arm with said strap, substantially as and for the purposes set forth.

4. In a device of the class described, the combination, with the vehicle, of sheaves having rigid support upon the vehicle-shaft above and outside the hind feet of the horse, sheaves upon the vehicle behind the horse, and a cord running over said sheaves on opposite sides and to the rear of the horse and adapted to have its ends respectively detachably connected to the hind feet of the horse, substantially as and for the purposes set forth.

In testimony whereof I have hereunto set my hand this 1st day of September, 1890.

WILLIAM SMITH.
    THEOPHILUS E. HILLS.

In presence of—
 T. A. ALEXANDER,
 A. A. BEEBE.